United States Patent
Hahn et al.

(10) Patent No.: US 12,208,858 B2
(45) Date of Patent: Jan. 28, 2025

(54) BICYCLE CONTROL SYSTEM

(71) Applicant: SRAM, LLC, Chicago, IL (US)

(72) Inventors: Sage Hahn, Chicago, IL (US); Brian Jordan, Highland Park, IL (US); Kevin Wesling, Lombard, IL (US)

(73) Assignee: SRAM, LLC, Chicago, IL (US)

( * ) Notice: Subject to any disclaimer, the term of this patent is extended or adjusted under 35 U.S.C. 154(b) by 229 days.

(21) Appl. No.: 16/787,899

(22) Filed: Feb. 11, 2020

(65) Prior Publication Data

US 2020/0262512 A1    Aug. 20, 2020

Related U.S. Application Data

(60) Provisional application No. 62/806,306, filed on Feb. 15, 2019.

(51) Int. Cl.
 *B62M 6/45* (2010.01)
 *B62M 6/50* (2010.01)
 *B62M 9/124* (2010.01)

(52) U.S. Cl.
 CPC ................ *B62M 6/45* (2013.01); *B62M 6/50* (2013.01); *B62M 9/124* (2013.01)

(58) Field of Classification Search
 CPC ................................ B62M 6/45; B62M 9/124
 See application file for complete search history.

(56) References Cited

U.S. PATENT DOCUMENTS

| | | | |
|---|---|---|---|
| 4,490,127 A * | 12/1984 | Matsumoto | B62M 9/122 701/64 |
| 5,261,858 A | 11/1993 | Browning | |
| 5,941,332 A | 8/1999 | Dimick | |
| 5,941,333 A | 8/1999 | Sun et al. | |
| 5,992,353 A | 11/1999 | Posselt | |
| 6,007,447 A | 12/1999 | Lin | |
| 6,012,538 A | 1/2000 | Sonobe et al. | |
| 6,047,230 A | 4/2000 | Spencer et al. | |
| 6,152,249 A | 11/2000 | Li et al. | |
| 6,152,250 A | 11/2000 | Shu-Hsien | |
| 6,196,347 B1 | 3/2001 | Chao et al. | |
| 6,216,078 B1 * | 4/2001 | Jinbo | B62K 23/06 340/432 |
| 6,276,479 B1 | 8/2001 | Suzuki et al. | |
| 6,569,045 B1 * | 5/2003 | Campagnolo | B62M 25/04 474/70 |
| 6,629,574 B2 | 10/2003 | Turner | |
| 7,001,294 B2 | 2/2006 | Fukuda | |

(Continued)

FOREIGN PATENT DOCUMENTS

| | | |
|---|---|---|
| CN | 1515453 A | 7/2004 |
| CN | 1530284 | 9/2004 |

(Continued)

*Primary Examiner* — Khoi H Tran
*Assistant Examiner* — Tristan J Greiner

(57) ABSTRACT

A bicycle with an electric pedal assist motor capable of driving a chainring independent of cranks includes wheel speed sensors and crank cadence sensors. The wheel speed sensors and the crank cadence sensors measure wheel speed and crank cadence, respectively, and provide the measured wheel speed and crank cadence to a controller of the bicycle. The controller is configured to instruct an assist motor to activate based on the measured wheel speed and/or the measured crank cadence.

18 Claims, 6 Drawing Sheets

(56) References Cited

U.S. PATENT DOCUMENTS

| | | |
|---|---|---|
| 8,738,212 B1 | 5/2014 | Schieffelin |
| 8,874,338 B2 | 10/2014 | Miglioranza |
| 9,090,178 B2 | 7/2015 | Tsuchizawa |
| 9,114,850 B2 | 8/2015 | Tanaka et al. |
| 9,234,580 B1 | 1/2016 | Usui et al. |
| 9,260,035 B2 | 2/2016 | Chun et al. |
| 9,447,869 B2 | 9/2016 | Tetsuka et al. |
| 9,611,002 B1 | 4/2017 | Shum et al. |
| 9,656,672 B2 | 5/2017 | Schieffelin |
| 9,873,287 B2 | 1/2018 | Eimura |
| 10,189,306 B2 | 1/2019 | Thoma |
| 10,300,809 B2 | 5/2019 | Lee |
| 10,313,445 B2 | 6/2019 | Ostergaard et al. |
| 10,358,133 B2 | 7/2019 | Schieffelin |
| 11,428,279 B2 | 8/2022 | Choltco-Devlin |
| 11,518,472 B2 | 12/2022 | Hahn |
| 2003/0234163 A1 | 12/2003 | Ichida et al. |
| 2004/0166972 A1 | 8/2004 | Takeda et al. |
| 2005/0075774 A1 | 4/2005 | Takamoto et al. |
| 2007/0232425 A1 | 10/2007 | Ichida |
| 2008/0121452 A1 | 5/2008 | Nirve |
| 2009/0164076 A1 | 6/2009 | Vasiliotis et al. |
| 2009/0204299 A1 | 8/2009 | Miglioranza |
| 2009/0261652 A1* | 10/2009 | Nakayama ............ B62K 23/06 307/9.1 |
| 2012/0112739 A1* | 5/2012 | Huang ................. G01R 33/072 324/251 |
| 2012/0226400 A1 | 9/2012 | Hsu |
| 2013/0054065 A1* | 2/2013 | Komatsu ............... B62K 23/02 701/22 |
| 2013/0054067 A1 | 2/2013 | Shoge |
| 2013/0054068 A1* | 2/2013 | Shoge ................... B62M 9/122 701/22 |
| 2013/0267376 A1 | 10/2013 | Takachi |
| 2014/0088806 A1 | 3/2014 | Lee |
| 2014/0166383 A1 | 6/2014 | Arimune |
| 2015/0088389 A1* | 3/2015 | Gao ......................... B62M 6/55 701/53 |
| 2015/0307157 A1 | 10/2015 | Gao |
| 2015/0360747 A1 | 12/2015 | Baumgaertner et al. |
| 2016/0009275 A1 | 1/2016 | Hieda et al. |
| 2016/0072942 A1 | 1/2016 | Kazuya et al. |
| 2016/0039497 A1 | 2/2016 | Mastracci |
| 2016/0052594 A1* | 2/2016 | Kimmich ................. B62M 6/45 701/22 |
| 2016/0121198 A1 | 5/2016 | Doerksen |
| 2016/0229487 A1 | 8/2016 | Dasbach et al. |
| 2016/0257373 A1* | 9/2016 | Emura ................. B62K 25/286 |
| 2017/0106866 A1* | 4/2017 | Schieffelin ............ B60W 10/11 |
| 2017/0183056 A1 | 6/2017 | Yamamoto |
| 2017/0225742 A1 | 8/2017 | Hancock et al. |
| 2017/0247080 A1 | 8/2017 | Tsuchizawa et al. |
| 2017/0327184 A1 | 11/2017 | Contello et al. |
| 2018/0056812 A1 | 3/2018 | Hamann |
| 2018/0111661 A1 | 4/2018 | Wesling |
| 2018/0118305 A1* | 5/2018 | Tsuchizawa ........... B62M 25/08 |
| 2018/0162475 A1 | 6/2018 | Peng |
| 2018/0197401 A1 | 7/2018 | Khaligh et al. |
| 2018/0257736 A1 | 9/2018 | Komatsu |
| 2018/0257737 A1 | 9/2018 | Komatsu |
| 2019/0126759 A1 | 5/2019 | Miller |
| 2019/0176930 A1 | 6/2019 | Wiegel |
| 2019/0249769 A1 | 8/2019 | Hamed |
| 2019/0300113 A1 | 10/2019 | Wesling |
| 2020/0079467 A1* | 3/2020 | Takayama ................ B62M 6/50 |
| 2021/0031882 A1 | 2/2021 | Tsuchizawa et al. |

FOREIGN PATENT DOCUMENTS

| | | |
|---|---|---|
| CN | 1600633 A | 3/2005 |
| CN | 1740050 | 3/2006 |
| CN | 101244753 | 8/2008 |
| CN | 201390360 Y | 1/2010 |
| CN | 102346446 | 2/2012 |
| CN | 102745299 | 10/2012 |
| CN | 102897276 | 1/2013 |
| CN | 102963483 | 3/2013 |
| CN | 102963486 A | 3/2013 |
| CN | 102963487 A | 3/2013 |
| CN | 102991640 | 3/2013 |
| CN | 103507908 | 1/2014 |
| CN | 103569303 | 2/2014 |
| CN | 103661707 | 3/2014 |
| CN | 103661786 A | 3/2014 |
| CN | 103786827 | 5/2014 |
| CN | 103979061 | 8/2014 |
| CN | 103991506 | 8/2014 |
| CN | 104108452 | 10/2014 |
| CN | 104340325 | 2/2015 |
| CN | 104443246 A | 3/2015 |
| CN | 204236732 U | 4/2015 |
| CN | 105292374 | 2/2016 |
| CN | 105314060 | 2/2016 |
| CN | 105460122 | 4/2016 |
| CN | 105501381 | 4/2016 |
| CN | 105539439 | 5/2016 |
| CN | 106184602 A | 12/2016 |
| CN | 106604862 | 4/2017 |
| CN | 107000807 | 8/2017 |
| CN | 107074320 | 8/2017 |
| CN | 107128434 | 9/2017 |
| CN | 107428393 | 12/2017 |
| CN | 107585252 | 1/2018 |
| CN | 107738723 | 2/2018 |
| CN | 207000726 U | 2/2018 |
| CN | 108016562 A | 5/2018 |
| CN | 106314201 B | 7/2018 |
| CN | 108284912 | 7/2018 |
| CN | 108622296 A | 10/2018 |
| CN | 109018171 | 12/2018 |
| CN | 109018184 | 12/2018 |
| DE | 202015103054 U | 8/2015 |
| DE | 102017009847 A1 | 4/2018 |
| DE | 102016225489 A1 | 6/2018 |
| EP | 1295786 | 3/2003 |
| EP | 1518785 A2 | 3/2005 |
| EP | 3133311 | 6/2016 |
| EP | 3072797 A1 | 9/2016 |
| EP | 2724925 | 1/2017 |
| EP | 3127799 A1 | 2/2017 |
| EP | 3150470 | 4/2017 |
| EP | 3168124 | 5/2017 |
| JP | 2010055261 A | 3/2010 |
| JP | 2010120569 | 6/2010 |
| JP | 3199830 U | 9/2015 |
| KR | 20110131002 | 12/2011 |
| KR | 101885715 B1 | 9/2018 |
| TW | 201204596 A | 2/2012 |
| TW | 201313547 A | 4/2013 |
| TW | 201313549 A | 4/2013 |
| TW | 201412600 A | 4/2014 |
| TW | 201416288 | 5/2014 |
| TW | 201437089 A | 10/2014 |
| TW | 201500259 A | 1/2015 |
| TW | 201512025 A | 4/2015 |
| TW | 201634346 | 10/2016 |
| TW | M548125 U | 9/2017 |
| TW | 201800301 | 1/2018 |
| TW | 201811616 | 4/2018 |
| TW | 201815620 | 5/2018 |
| TW | 201815623 A | 5/2018 |
| TW | 201817638 | 5/2018 |
| TW | 201823092 | 7/2018 |
| TW | 201823102 | 7/2018 |
| TW | 201904809 | 2/2019 |
| WO | 2011072942 A1 | 6/2011 |
| WO | 2011078546 | 6/2011 |
| WO | 2012093435 A1 | 7/2012 |
| WO | 2015073791 A1 | 5/2015 |
| WO | 2016130833 A1 | 8/2016 |

(56) References Cited

FOREIGN PATENT DOCUMENTS

| WO | 2016177084 | 11/2016 |
| WO | 2017217936 | 12/2017 |

\* cited by examiner

BICYCLE CONTROL SYSTEM

PRIORITY

This application claims priority to, and/or the benefit of, U.S. Provisional Application 62/806,306, filed on Feb. 15, 2019, the contents of which are included by reference herein in their entirety.

BACKGROUND

An electric bicycle ("e-bike") is a bicycle with an integrated electric motor that can be used for propulsion. An e-bike retains the ability to be pedaled, and therefore is not an electric motorcycle. E-bikes use rechargeable batteries and typically may travel between 15 and 30 miles per hour. E-bikes are becoming a popular mode of travel all over the world and are an environmentally friendly method of transportation.

SUMMARY

According to one aspect, controlling a bicycle having a drivetrain, the drivetrain including a gear changer and an electric power assist motor that provides power to the drivetrain, includes: having a detection device that detects a cable reaction indicating a shift of the gear changer, generating a signal, and communicating the signal to a controller. The controller causes the assist motor to provide power to the drivetrain in response to the signal.

According to one aspect of controlling a bicycle, the bicycle includes: a drivetrain having a gear changer; a detection device disposed on the bicycle; an electric power assist motor providing power to the drivetrain; and a controller configured to: receive, from the detection device, a signal generated in response to a cable reaction, the cable reaction indicating a shift of the gear changer; and cause the assist motor to provide power to the drivetrain in response to the signal.

According to one aspect, an example method of controlling a bicycle having a drivetrain, the drivetrain including a gear changer and an electric power assist motor configured to provide power to the drivetrain includes: a detection device detecting a cable reaction indicating a shift of the gear changer; generating a signal; and communicating the signal to a controller. The controller causes the assist motor to provide power to the drivetrain in response to the signal.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

An e-bike includes one or more pedal assist motors. The pedal assist motors may turn a driving chainring independent of the cranks. Accordingly, when the pedal assist electric motors are active, motor torque is not transferred to the legs of the rider if the rider slows a pedaling rate faster than the motor can react. In other words, the rider does not sense the motor torque in such a pedaling slow down.

Based on an input such as, for example, the pressing of a button on the e-bike by the rider, some e-bikes may use the pedal assist motors to assist the rider when the rider is, for example, walking beside the e-bike and pushing the e-bike up a steep incline. The input from the user may activate the pedal assist motors at a low speed without the cranks and pedals rotating unsafely.

Bicycles with pedal assist electric motors include wheel speed and crank speed sensors that may be used as inputs to automatic shifting algorithms for a bicycle transmission. One limitation of automatic shifting algorithms of a bicycle transmission is that shifting may only occur when a drivetrain is moving, such as when, for example, a rider is pedaling.

A bicycle with an electric pedal assist motor capable of driving a chainring independent of cranks is provided. The bicycle includes wheel speed sensors and crank cadence sensors. The wheel speed sensors and the crank cadence sensors measure wheel speed and crank cadence, respectively, and provide the measured wheel speed and crank cadence to an electric rear derailleur of the bicycle. The electric rear derailleur is configured to instruct an e-bike controller to activate motor overdrive based on the measured wheel speed and/or the measured crank cadence.

Figure 1:
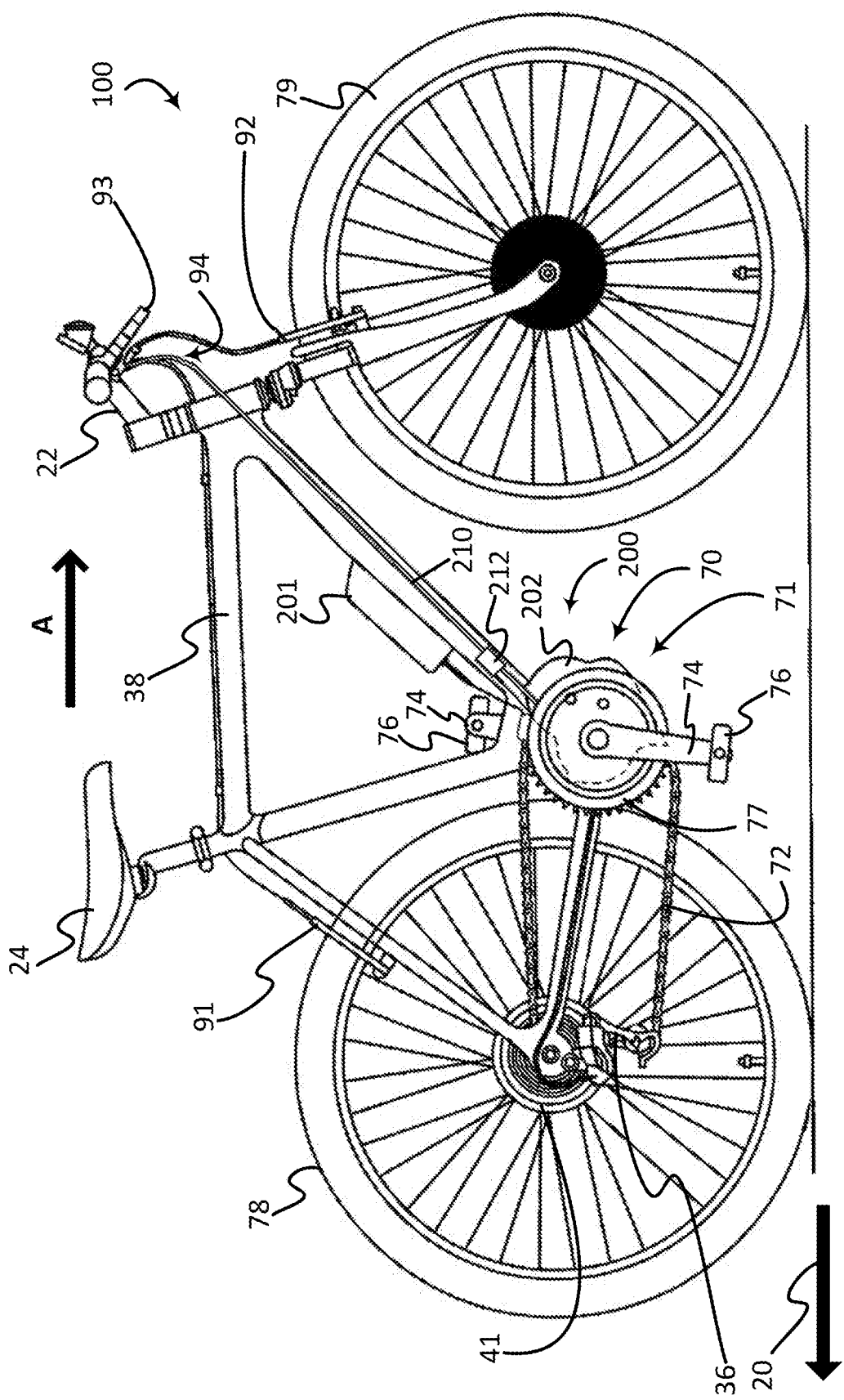
FIG. 1 shows a side view of one example of a bicycle with component motion that may be controlled in accordance with the teachings of this disclosure.

Turning now to the drawings, FIG. 1 illustrates an example bicycle 100 (e.g., e-bike) that may be used to implement a connection to a gear changer 36. In the illustrated embodiment, the bicycle 100 includes a frame 38, handlebars 22, shifters 94, and a seat 24. The bicycle 100 also includes a first or front wheel 79 and a second or rear wheel 78. A front brake 92 and/or a rear brake 91 are included to brake the front wheel 79 and the rear wheel 78, respectively. The front brake 92 and/or the rear brake 91 are controlled by at least one brake actuator 93. The bicycle 100 includes a drivetrain 70. The drivetrain 70 of FIG. 1 includes a crank assembly 71 operatively coupled to a rear cassette 41 via a chain 72. The crank assembly 71 includes crank arms 74 and pedals 76, as well as at least one chainring 77 configured to operatively couple with the chain 72 to transmit force and/or power exerted onto the crank assembly 71 to the chain 72. This force and/or power is transmitted to the rear cassette 41 by the chain 72, whereby a motivating force 20 and/or power is transmitted to the rear wheel 78 from the rear cassette 41. The drivetrain 70 includes the gear changer 36.

The drivetrain 70 may also include a power assist device 200. In the example, the power assist device 200 may include an assist motor 202. Pedaling torque is applied to the crank assembly 71 by a rider using the pedals 76 and crank arms 74. The power assist device 200 is configured to assist the rotation of the rear wheel 78. In the illustrated embodiment, the power assist device 200 is configured to assist the rotation of the wheel rear 78 via a coupled connection to the crank assembly 71 with the power assist device located at the crank assembly 71. The power assist device 200 is powered by a remote power source 201.

The chain 72 may be moved between individual sprockets of the rear cassette 41 using the gear changer 36, such as a rear derailleur 36, as shown in FIG. 1. In the example, the rear derailleur 36 is a mechanical (e.g., cable actuated) rear derailleur that is controlled by the shifters 94 on the handlebars 22 connected by a cable or wire 210 between the shifters 94 and the rear derailleur 36. The cable 210 includes a detection device 212 on the cable 210. The detection device 212 may be used to detect a cable reaction caused by a user operating the shifter 94 (e.g., actuating the shifter). The detection device 212 is configured to be disposed on the bicycle 100. The detection device 212 is operable to generate a signal indicative of the detected cable reaction. In an embodiment, as illustrated in FIG. 1, the cable reaction is a shift command initiated by the operation of the shifters 94. The cable reaction signal, or interpreted shift commands, may be communicated to a controller, such as bike controller 402 (see FIG. 3) using wired and/or wireless communication techniques. The cable reaction may be a movement of the cable 210.

In an alternate example, the rear derailleur 36 is a gear changer that is controlled by signals indicating that a shift command has been actuated by the bicycle operator, or rider. Such a gear changer may include a cable actuation device configured to communicate with a shifter through electronic or wireless signals, and electromechanically manipulate a cable to operate the gear changer. In such an embodiment, the detection device may be configured to detect a reaction of the cable disposed between the cable actuation device and the gear changer.

Figure 2:
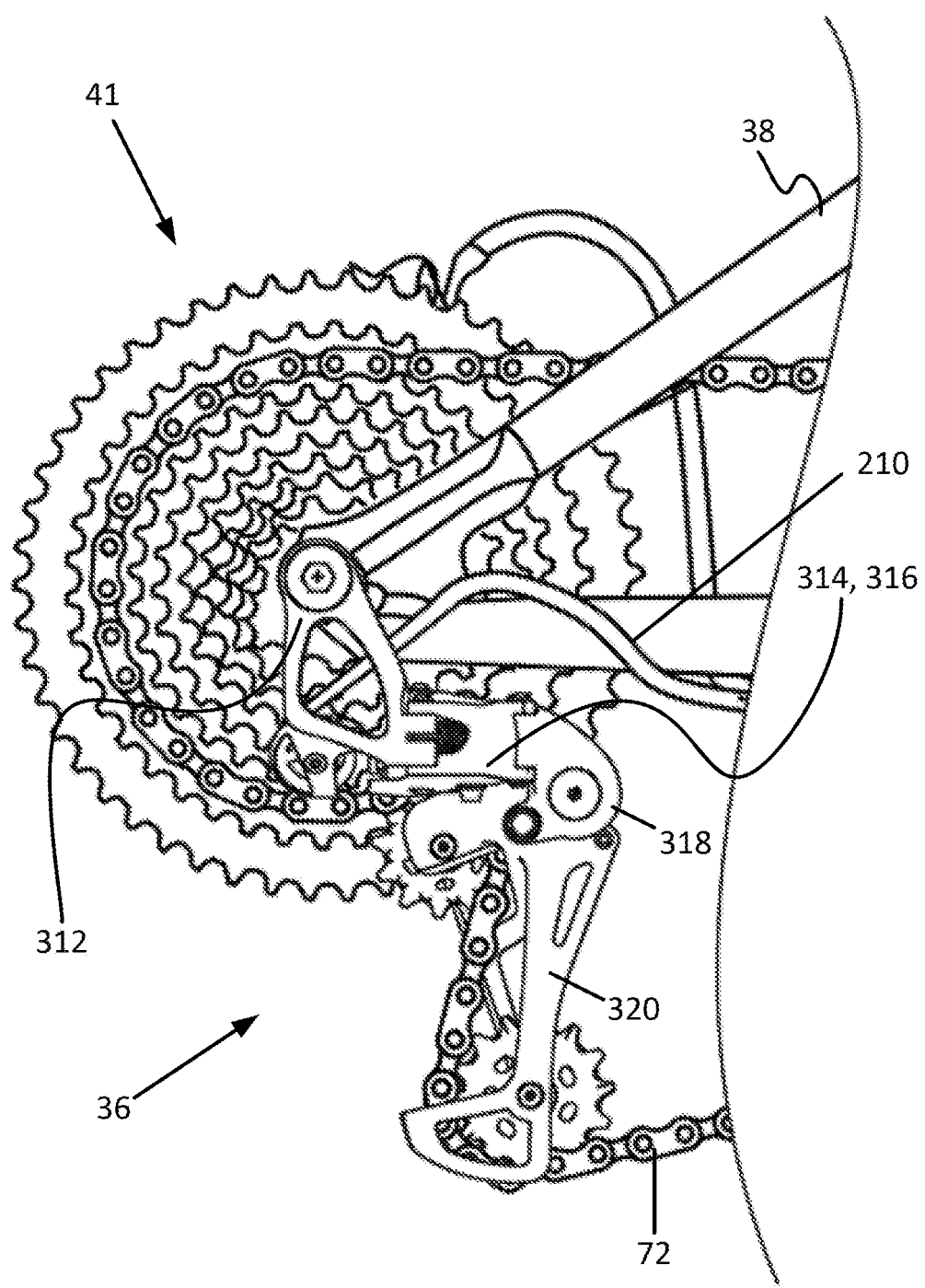
FIG. 2 is a side view of one example of a rear derailleur.

Referring to FIG. 2, the rear derailleur 36 is attached to the bicycle frame 38 and positioned next to the rear cassette 41. The chain 72 is shown in FIG. 2. The rear derailleur 36 is a cable actuated rear derailleur and includes a base member 312 (e.g., a "b-knuckle"), an outer link 314, and an inner link 316. The base member 312 is attachable to the bicycle frame 38 in a conventional manner. The inner link 316 is pivotally attached to the base member 312 by link pins, for example. A movable member or assembly 318 (e.g., a "p-knuckle") is pivotally connected to the outer link 314 and the inner link 316 at an end opposite the base member 312 to permit displacement of the movable assembly 318 relative to the base member 312. A chain guide assembly 320 (e.g., a cage) is configured to engage and maintain tension in the chain 72 and is pivotally connected to a part of the movable assembly 318.

As shown, the bicycle 100 may include a handlebar mounted user interface, by way of the shift actuator or cable shifters 94. All of these components may be connected to the remote power source or remote battery 201. Additionally, all the communication between the e-bike central control system/central controller and each component is achieved through wired or wireless communication. There may be discrete control with individual wires from the central controller to each component or the system may use a controller area network ("CAN") bus designed to allow microcontrollers and devices to communicate with each other in applications.

While the illustrated bicycle 100 is a mountain bicycle and may include suspension components, such as a shock absorbing front fork, the embodiments disclosed herein may be implemented with other types of bicycles such as, for example, road bicycles. The front and/or forward orientation of the bicycle 100 is indicated by the direction of the arrow "A" in FIG. 1. As such, a forward direction of movement of the bicycle is indicated by the direction of the arrow A.

An e-bike central control system or controller may be supported by a same housing as the remote power source 201. The e-bike controller may control power from the remote power source 201 to components on the bicycle 100 such as, for example, the power assist device 200. The e-bike controller may control power to other and/or different components on the bicycle 100. The e-bike controller may send signals (e.g., instructions) to and/or receive data (e.g., instructions and/or sensor data) from components on the bicycle 100 such as, for example, the cable 210, derailleur 36, a suspension system, and/or a seat post assembly to actuate and/or control components of the bicycle 100.

In other embodiments, the e-bike controller may be located in other locations (e.g., mounted on the handlebars) on the bicycle 100 or, alternatively, may be distributed among various components of the bicycle 100, with routing of a communication link to accommodate necessary signal and power paths. The e-bike controller may also be located other than on the bicycle 100, such as, for example, on a rider's wrist or in a jersey pocket. The communication link may include wires, may be wireless, or may be a combination thereof. In one example, the e-bike controller may be integrated with the rear derailleur 36 to communicate control commands between components. The e-bike controller may include a processor, communication device (e.g. a wireless communication device), a memory, and one or more communication interfaces.

In one example, the e-bike controller actuates the derailleur and operates the derailleur 36 for executing gear changes and gear selection. Additionally or alternatively, the e-bike controller may be configured to control gear shifting of a front gear changer.

Figure 3:
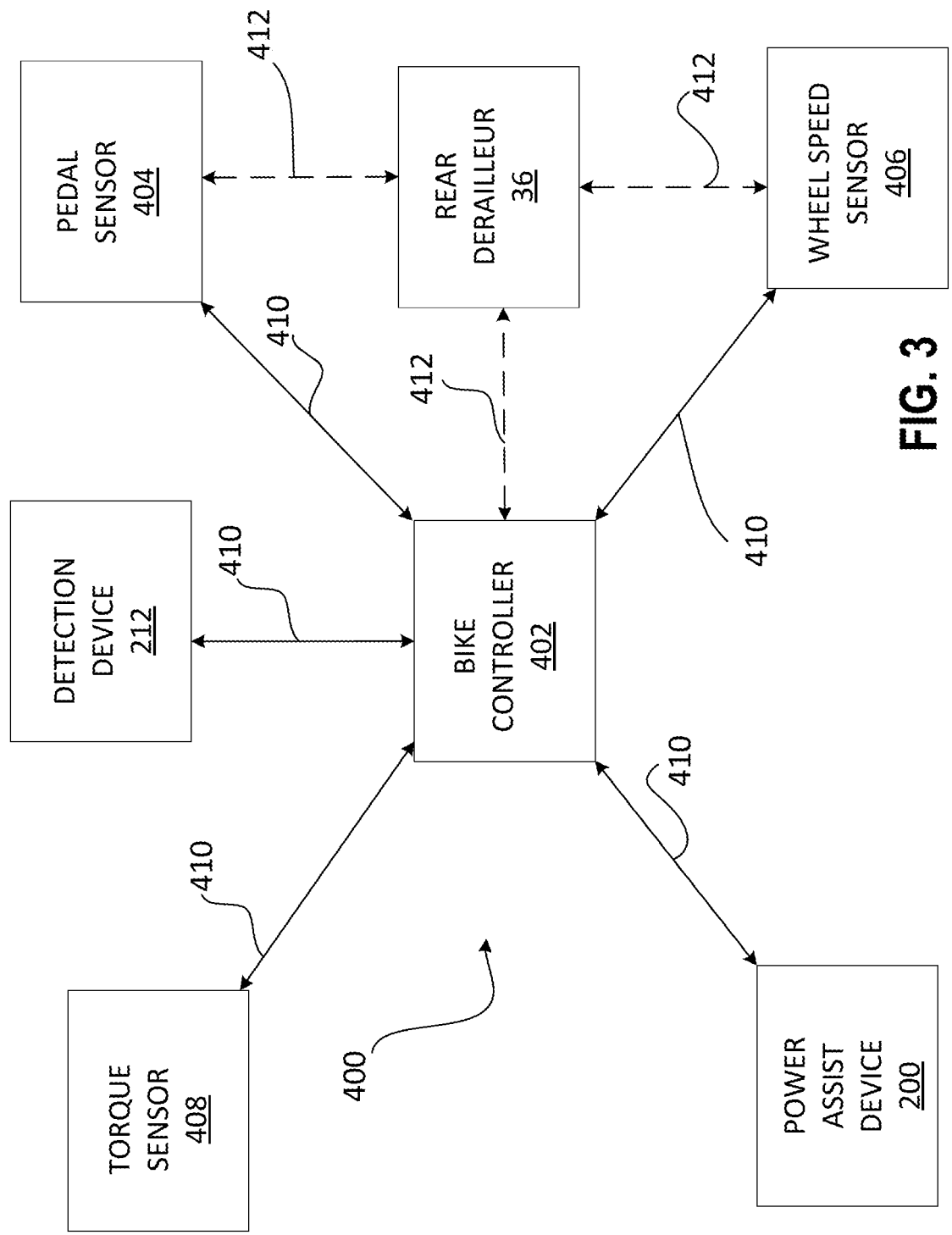
FIG. 3 is a block diagram of an embodiment of an electromechanical control system.

FIG. 3 shows an example of a control system 400 (e.g., an electromechanical control system) for the bicycle 100, for example. The control system 400 includes the e-bike controller 402, the power assist device 200, the rear derailleur 36, and one or more sensors. The power assist device 200 includes, for example, an assist motor 202.

The one or more sensors include, for example, a pedal speed sensor 404, a wheel speed sensor 406, a torque sensor 408, and a detection device 212. For example, the pedal speed sensor 404 measures a rotational speed of at least one of the crank arms 74, the wheel speed sensor 406 measures a rotational speed of at least one of the wheels 78, 79, and the torque sensor 408 measures a torque on the crank assembly 71 and/or a torque on an output shaft of the assist motor 202. The control system 400 may include more, fewer, and/or different sensors. For example, the one or more sensors may include more than one wheel speed sensors 406, one for the front wheel 79 and one for the rear wheel 78.

The detection device 212 is used specifically when the bicycle 100 includes cable actuated shifters 94 and rear derailleur 36. The detection device 212 may be a switch, potentiometer, and/or sensor configured for detection of a reaction of a cable. In the example of FIG. 1, the cable 210 may be a Bowden cable. In the example, the detection device 212 may be a cable reaction or motion detecting device, such as a potentiometer, connected to the Bowden cable with a microcontroller monitoring a potentiometer resistance. In an alternate embodiment, a stationary sensor may be used. If used, the stationary sensor may be attached to the bicycle frame 38. For example, a Hall effect sensor, located on the bicycle frame 38, may be used in conjunction with a magnet. The magnet may be connected to a cable and the Hall effect sensor may monitor the movement/motion of the cable by monitoring the magnet. In a further embodiment, a linear potentiometer detecting position, or a rotary potentiometer detecting rotation may be used.

In a further embodiment, the detection device 212 may be located anywhere on the bicycle 100. For example, the detection device 212 may be an electric switch or potentiometer. The electric switch or potentiometer may be located in the shifter. In an alternate embodiment, the electric switch or potentiometer may be located in or on the rear derailleur 36. A detection device located in the rear derailleur or the shifter may be momentarily actuated with each action of the shifter or derailleur. Combinations of these examples, as well as other techniques, may also be used as the detection device 212.

The pedal speed sensor 404, the wheel speed sensor 406, and the torque sensor 408 may be any number of different types of sensors. For example, the pedal speed sensor 404 and the wheel speed sensor 406 may be a combined speed and cadence sensor. The speed and cadence sensor may include a spoke magnet attached to a spoke of the front wheel 79 or the rear wheel 78 and/or a cadence magnet attached to one of the crank arms 74, and a sensor attached to the frame 38 of the bicycle 100 (e.g., a Hall effect sensor). The sensor attached to the frame 38 of the bicycle is configured to identify and count rotations of one crank arm 74 and/or the front wheel 79 or the rear wheel 78 based on the cadence magnet and/or the spoke magnet passing the sensor attached to the frame 38, respectively. Other types of sensors may be provided (e.g., a combination of a gyroscope and an accelerometer for the wheel speed sensor 406). The torque sensor 408 may include, for example, magnetoelastic torque sensors, strain gauges, SAW devices, and/or other types of torque sensors. In one embodiment, the torque sensor 408 is a current sensor that measures current through the assist motor 202. The amount of current consumed by the assist motor 202 is proportional to a torque the assist motor 202 applies to a drivetrain of the bicycle 100. In one embodiment, each of at least the rear derailleur 36 and the e-bike controller 402 is in direct communication with the detection device 212. Communication between the controller 402, the rear derailleur 36, and the detection device 212 may be wired communication and/or wireless communication.

As shown in the embodiment of FIG. 3, the power assist device 200, the rear derailleur 36, and the one or more sensors (e.g., the pedal speed sensor 404, the wheel speed sensor 406, the detection device 212, and the torque sensor 408) may be in direct communication with the e-bike controller 402. Alternatively or additionally, at least some components of the control system 400 may be in indirect communication with the e-bike controller 402. For example, the wheel speed sensor 406 and/or the pedal speed sensor 404 may be in direct communication with the rear derailleur 36 and indirect communication with the with the e-bike controller 402 via the rear derailleur 36. In one embodiment, each of at least the rear derailleur 36 and the e-bike controller 402 is in direct communication with all sensors of, for example, the pedal speed sensor 404, the wheel speed sensor 406, the detection device 212, and the torque sensor 408. Other and/or different components of the control system 400 may be in direct communication with all sensors of the one or more sensors (e.g., the power assist device 200). Communication between the components of the control system 400 may be wired communication and/or wireless communication.

Each communication link 410 between the components of the control system 400 may be in both directions. In other words, data flow between components of the control system 400 in direct communication may be in both directions. For example, the wheel speed sensor 406 may receive signals from the e-bike controller 402 (e.g., as to when to measure the rotational speed) and return the measured rotational speed to the e-bike controller 402.

In an example, the rear derailleur 36 may include the capability to communicate with various sensors (e.g., the detection device 212, the pedal sensor 404, and/or the wheel speed sensor 406) and the bike controller 402. Examples of this communication is shown as dashed lines 412. Communications and data may be transmitted and received between the sensors, the bike controller 402, and the rear derailleur 36. This may occur when, for example, the rear derailleur 36 includes a cable actuation device that will pull the cable 210 to actuate the cable 210 when a shift signal is not communicated by a rider but the bike controller 402 determines a shift is necessary. In an alternate example, the bike controller 402 may be located on, in, and/or near the rear derailleur 36.

Figure 4:
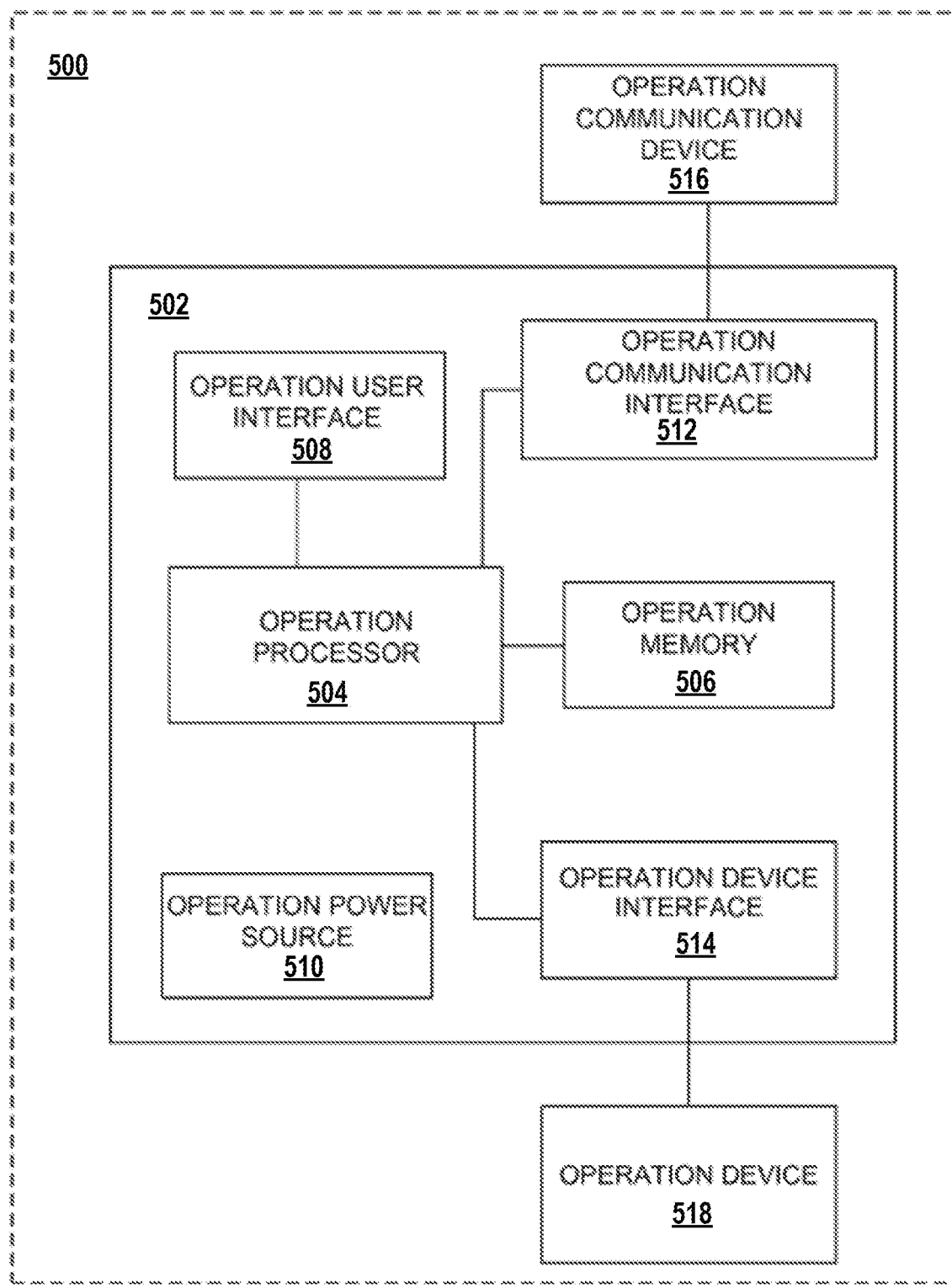
FIG. 4 is a block diagram of an operation component.

FIG. 4 is a block diagram of an operation component 500. The operation component 500 may be or may be part of one or more of the previously described components such as, for example, the rear derailleur 36, the e-bike controller 402, and a front gear changer. The operation component 500 may also be another component, such as the power assist device 200, an internal gearbox component, a suspension or an adjustable suspension component, or an adjustable seating component. A plurality of operation components 500 may be provided.

The operation component 500 is provided with an operation unit 502, which may be a circuit board or an alternative configuration. The operation unit 502 includes an operation processor 504, an operation memory 506, an operation user interface 508, an operation power source 510, an operation communication interface 512, and an operation device interface 514. In an embodiment, the operation communication interface 512 is in communication with an operation communication device 516, and the operation device interface 514 is in communication with an operation device 518. Additional, different, or fewer components may be provided. For example, the operation user interface 508 may be omitted.

The structure, connections, and functions of the operation processor 504 may be representative of those of the rear processor, the front processor, or another component. The operation processor 504 may include a general processor, digital signal processor, an ASIC, FPGA, analog circuit, digital circuit, combinations thereof, or other now known or later developed processor. The operation processor 504 may be a single device or combinations of devices, such as through shared or parallel processing.

The operation memory 506 may be a volatile memory or a non-volatile memory. The operation memory 506 may include one or more of a ROM, a RAM, a flash memory, an EEPROM, or other type of memory. The operation memory 506 may be removable from the operation component 500, such as an SD memory card. In a particular non-limiting, exemplary embodiment, a computer-readable medium can include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device. Accordingly, the disclosure is considered to include any one or more of a computer-readable medium and other equivalents and successor media, in which data or instructions may be stored.

The operation memory 506 is a non-transitory computer-readable medium and is described to be a single medium. However, the term "computer-readable medium" includes a single medium or multiple media, such as a centralized or distributed memory structure, and/or associated caches that are operable to store one or more sets of instructions and other data. The term "computer-readable medium" shall also include any medium that is capable of storing, encoding or carrying a set of instructions for execution by a processor or that cause a computer system to perform any one or more of the methods or operations disclosed herein.

The operation power source 510 is a portable power source, which may be stored internal to the operation component 500 or stored external to the operation component 500 and communicated to the operation component through a power conductive cable. The operation power source 510 may involve the generation of electric power, for example using a mechanical power generator, a fuel cell device, photo-voltaic cells, piezoelectric, or other power-generating devices. The operation power source 510 may include a battery such as a device consisting of two or more electrochemical cells that convert stored chemical energy into electrical energy. The operation power source 510 may include a combination of multiple batteries or other power providing devices. Specially fitted or configured battery types, or standard battery types may be used.

In the example where the operation component 500 is the e-bike controller 402, the operation power source 510 may be stored internal or external to the operation component 500. For example, the e-bike controller 402 may be supported within a housing of the remote power source 201 of FIG. 1.

The operation device interface 514 provides for operation of a component of the bicycle 100. For example, the operation device interface 514 may transmit power from the operation power source 510 to generate movement in the operation device 518. In various embodiments, the operation device interface 514 sends power to control movement of the assist motor 202, a motor of the rear derailleur 36 (e.g., if the rear derailleur 36 includes a cable actuation device), a motor of the front derailleur (e.g., if the front derailleur includes a cable actuation device), or any combination thereof. In one embodiment, the operation component 500 is the e-bike controller 402, and the operation device interface 514 sends power to control movement of the power assist device 200. The operation device interface 514 includes wired conductive signals and/or data communication circuitry operable to control the operation device 518.

The operation user interface 508 may be one or more buttons, keypad, keyboard, mouse, stylus pen, trackball, rocker switch, touch pad, voice recognition circuit, or other device or component for communicating data between a user and the operation component 500. The operation user interface 508 may be a touch screen, which may be capacitive or resistive. The operation user interface 508 may include an LCD panel, LED, LED screen, TFT screen, or another type of display. The operation user interface 508 may also include audio capabilities or speakers.

The operation communication interface 512 is configured to receive, with the operation communication device 516, data such as measurement data (e.g., rotational crank speed, rotational wheel speed, torque, and/or cable actuation), anticipation signals, operation signals, and/or other signals from bicycle components (e.g., the pedal speed sensor 404, the wheel speed sensor 406, detection device 212, and/or the torque sensor 408; the e-bike controller 402). In one embodiment, the operation component 500 includes more than one operation communication interface 512 in communication with more than one operation communication device 516, respectively. The operation communication interface 512 may also be configured to send data such as status signals (e.g., temperature sensor signals) for reception by, for example, the e-bike controller 402. The operation communication interface 512 communicates the data using any operable connection. An operable connection may be one in which signals, physical communications, and/or logical communications may be sent and/or received. An operable connection may include a physical interface, an electrical interface, and/or a data interface. One or more operation communication interfaces may provide for wireless communications through the operation communication device 516 in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

In accordance with various embodiments of the present disclosure, methods described herein may be implemented with software programs executable by a computer system, such as components of the control system 400 (e.g., the e-bike controller 402), and/or other components on the bicycle 100 and/or worn by the user. Further, in an exemplary, non-limited embodiment, implementations may include distributed processing, component/object distributed processing, and parallel processing. Alternatively, virtual computer system processing can be constructed to implement one or more of the methods or functionality as described herein.

A computer program (also known as a program, software, software application, script, or code) may be written in any form of programming language, including compiled or interpreted languages, and the computer program may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and the apparatus may also be implemented as, special purpose logic circuitry (e.g., an FPGA or an ASIC).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware, as well as other electronic components. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data (e.g., magnetic, magneto optical disks, or optical disks). However, a computer need not have such devices. Moreover, a computer may be embedded in another device such as, for example, a mobile telephone, a personal digital assistant ("PDA"), a mobile audio player, a Global Positioning System ("GPS") receiver, a control unit, a rear derailleur, or a front gear changer, to name just a few. Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD-ROM and DVD-ROM disks. The processor and the memory may be supplemented by, or incorporated in, special purpose logic circuitry.

The operation communication device 516 provides for data and/or signal communication from the operation component 500 to another component of the bicycle 100, or an external device such as a mobile phone or other computing device. The operation communication device communicates the data using any operable connection. An operable connection may be one in which signals, physical communications, and/or logical communications may be sent and/or received. An operable connection may include a physical interface, an electrical interface, and/or a data interface. The control communication device may be configured to communicate wirelessly, and as such include one or more antennae. The control communication device provides for wireless communications in any now known or later developed format.

A control antenna may also be provided. The control antenna may be a plurality of control antennae. The control unit includes an antenna included with the circuitry of the PCB; however, additional antennae may also be included in the circuitry. The control antenna may be integrated with another component of the bicycle 100 or may be an independent component. For example, the control antenna may be integrated as part of the e-bike controller 402.

The e-bike controller 402 may allow configuration of a number of ride modes that may be switched between by a control unit (e.g., the e-bike controller 402 or another controller on or outside of the bicycle 100). The control unit may switch the ride mode based on user input (e.g., via the shifters 94 or another interface) or automatically based on sensed conditions. In each mode, various characteristics of the ride mode may be adjusted. For example, gear hysteresis, minimum gear to shift to without pedaling, and/or other characteristics may be adjusted.

Figure 5:
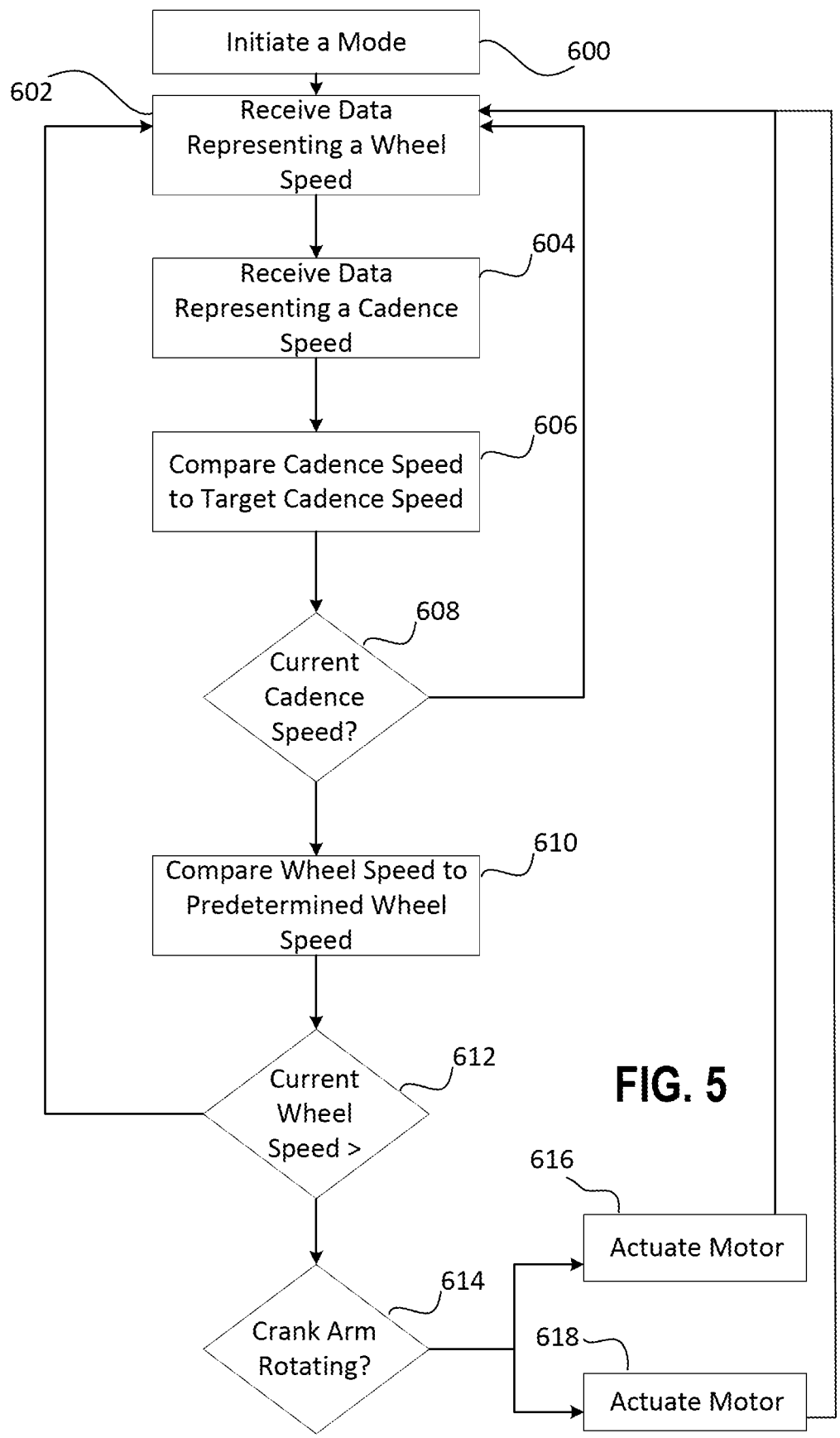
FIG. 5 is a flowchart of an embodiment of a method for automatic shifting.

FIG. 5 is a flowchart of an embodiment of a method for electromechanical control of components of the bicycle 100, for example. The flowchart also illustrates a method for transmitting and receiving wireless signals on the bicycle 100. As presented in the following sections, the acts may be performed using any combination of the components indicated in previous figures. For example, the following acts may be performed by at least some components of the control system 400, as well as additional or other components. In an embodiment, the acts may be performed by, for example, the e-bike controller 402, the power assist device 200, the one or more sensors, or any combination thereof. Additional, different, or fewer acts may be provided. The acts are performed in the order shown or in other orders. The acts may be repeated.

In act 600, a processor initiates a mode (e.g., a full automatic mode) for a bicycle. In the full automatic mode, a derailleur (e.g., the derailleur 36) is shifted without user input to maintain a gear that results in a rider cadence close to a defined target based on a current wheel speed. The processor may initiate the full automatic mode based on user input or automatically based on sensed riding conditions. In one embodiment, the processor is a processor of the derailleur and initiates the full automatic mode based on instructions from another processor that received the user input or identified the sensed riding conditions (e.g., the e-bike controller 402).

In act 602, the processor receives data representing a wheel speed from a sensor (e.g., a wheel speed sensor; the wheel speed sensor 406). The wheel speed sensor measures rotational speed of a wheel continuously or at a predetermined interval. The received data representing the wheel speed may be for a front wheel of the bicycle and/or a rear wheel of the bicycle. The data representing the wheel speed may be a rotational speed value (e.g., in revolutions per minute).

In act 604, the processor receives data representing a cadence speed from a sensor (e.g., a pedal speed sensor or crank cadence sensor; the pedal speed sensor 404). The pedal speed sensor measures rotational speed of a crank arm to which a pedal of the bicycle is attached continuously or at a predetermined interval. The data representing the cadence speed may be rotational speed value (e.g., in revolutions per minute).

Some wheel speed and crank cadence sensors that may be used as inputs to the method use a single magnet mounted on the wheel or crank, respectively, and a single reed switch or hall effect sensor mounted to the frame. As the wheel or crank rotates, the magnet passes by the Hall effect sensor or the reed switch once per revolution, generating a signal that is read by the processor. These sensor systems measure crank or wheel angular velocity using a time between activations of the reed switch or the Hall effect sensor. As a wheel or a crank decelerates, a time period between hall or reed events increases. The rotational speed calculated by the microprocessor is only updated when a sensor event occurs. The automatic shifting performance of the method described above increases the faster the current wheel or the current crank speed may be accurately updated. When the wheel or the crank comes to a complete stop, the magnet does not pass by the Hall effect sensor or the reed switch again, so the time to update the speed becomes infinite. To prevent this, the processor has a maximum time between activations, beyond which the crank speed or the wheel speed is assumed to be 0 (e.g., greater than 2 seconds, effectively stopped). If the rider has decelerated from 60 RPM to 0 RPM within 1 revolution of the wheel, the processor would have to wait two seconds to make that determination If the method makes a critical decision after the wheel speed has dropped below 50 RPM, the processor may estimate when this has occurred by tracking how much time has elapsed since the last sensor event. It may be assumed that the bicycle is not traveling faster than 60 seconds/seconds elapsed since last event (RPM). Using this calculation allows the bicycle (e.g., the processor) to act faster on crank speed and/or or wheel speed information faster than waiting for the next signal to occur.

In act 606, the processor compares the data representing the cadence speed (e.g., current cadence speed) received in act 604 to a target cadence speed. The target cadence speed may be user defined. For example, the bicycle may include one or more control devices (e.g., two control buttons) mounted on the handlebars of the bicycle. The two control buttons may be in communication (e.g., wireless communication and/or wired communication) with, for example, the e-bike controller 402 and/or other components on the bicycle. One of the two control buttons may generate a signal instructing an increase in the target cadence speed when pressed, and the other of the two control buttons may generate a signal instructing a decrease in the target cadence speed when pressed. A single press of either of the two control buttons, for example, increments or decrements the target cadence speed (e.g., a setpoint) by a configurable number of RPM. In one embodiment, the setpoint is adjustable within functionally practical predetermined bounds (e.g., 60 RPMs-120 RPMs). The rider attempting to adjust beyond the limits of the predetermined bounds has no effect on the setpoint. In other words, the setpoint will remain at the lower bound or the higher bound. The predetermined bounds may also be adjustable.

A memory in communication with the processor (e.g., a memory of the derailleur 36 or a memory of the e-bike controller 402) stores a gear ratio table and upshift/downshift tables. When the setpoint is adjusted by the rider, the processor recalculates the gear ratio table and the upshift/downshift tables based on the adjusted setpoint. If a closest gear ratio changes at the time of the setpoint adjustment, the derailleur immediately shifts, ignoring hysteresis built into the upshift/downshift tables.

In one embodiment, the setpoint adjustment is configured through a system control interface (e.g., an e-bike system control interface). The system control interface may be capable of displaying a current setpoint and directly adjusting the setpoint on the rear derailleur. In another embodiment, the setpoint adjustment is executed via a mobile device application in direct communication with the rear derailleur.

In act 608, the processor determines whether the current cadence speed received in act 604 is within a range (e.g., within 3 RPMs) relative to the target cadence speed based on the comparison of act 606. If the current cadence speed is within the range, the method returns to act 602. If the current cadence speed is outside of the range, the method moves to act 610.

In act 610, the processor compares the current wheel speed to a predetermined minimum wheel speed. The predetermined minimum wheel speed represents, for example, a functional minimum rotational wheel speed.

In act 612, the processor determines whether the current wheel speed is greater than or less than the predetermined minimum wheel speed based on the comparison in act 610. If the processor determines the current wheel speed is less than the predetermined minimum wheel speed, a shift is not initiated, and the method returns to act 602. If the processor determines the current wheel speed is greater than the predetermined minimum wheel speed, the method moves to act 614.

The feature of overdriving chainring while not pedaling is limited by speed of bicycle. This provides that the chainring is not to be driven at a speed such that torque is applied to the wheel. Because of this, the method described above may not be applied when the bicycle is moving very slowly or is stopped. To overcome this, a hub capable of decoupling the cassette may be used. When the bicycle is stopped or moving below a speed at which the overdrive function may be safely used, the rear hub may decouple or declutch the cassette from itself to allow forward motion of the cassette without applying torque to the wheel. With the hub decoupled, the derailleur may change gears, and the assist motor may run in overdrive to select a desirable gear for the slow or stopped condition. The crank speed sensor may be used to detect resumed rider input into the system. The control system recouples the cassette to the hub when rider pedaling or faster rider pedaling is detected.

In act 614, the processor determines whether the crank arm is rotating. For example, the processor determines whether the crank arm is rotating based on the current cadence speed received at act 604. If the current cadence speed is greater than a cadence threshold (e.g., 1 RPMs), the method moves to act 616. If the current cadence speed is equal to or less than the cadence threshold, (e.g., equal to zero or approximately zero, such as less than or equal to 1 RPMs), the method moves to act 618.

In act 616, the processor instructs a motor (e.g., a motor of the derailleur 36 or the assist motor 202) to actuate and shift to maintain a gear that results in a rider cadence close to (e.g., within the range discussed above) the target cadences speed identified in act 606. After act 616, the method returns to act 602.

When performing automatic shifts, the derailleur may adjust a minimum timing between shifts based on current wheel speed, current cog, current rider cadence, or some other parameter to provide that each shift is completed before a next shift is attempted. This timing is optimized to allow shifting as fast as possible without inducing a shift failure.

The assist motor is to not run without the user pedaling such that the motor is accelerating or maintaining the bicycle speed. This is not difficult if the current wheel speed is accurate. The wheel speed sensor may, however, update the current wheel speed only once per revolution of the wheel. During rapid deceleration events, the bicycle may drop below a speed of the assist motor before the wheel speed sensor has reported the speed change. An accelerometer or inertial measurement unit (IMU) may be used to supplement the wheel speed sensor data by disabling the assist motor in the event of a significant deceleration. If a rapid deceleration event occurs, the assist motor may be temporarily stopped (e.g., if currently running) until wheel speed data has been updated.

In act 618, the processor instructs, for example, the assist motor to run for a period of time to allow the chain to derail to a target cog (e.g., with the motor of the derailleur 36). After act 618, the method returns to act 602.

When using the assist motor to facilitate shifting while the rider is not pedaling, the assist motor should be running the drivetrain slower than the bicycle in moving. A threshold for an amount of current consumed by the assist motor (e.g., proportional to the torque the assist motor is applying to the drivetrain) may be defined to prevent the motor from unwanted power input into the drivetrain. This is an intentionally redundant method of shutting down the assist motor to the speed calculation. It is important that the assist motor not apply unexpected torque to the drivetrain, causing unexpected acceleration of the bicycle.

A rate at which the assist motor, for example, drives the chain to facilitate shifting while the rider is not pedaling is to be low enough such that for a current gear ratio and the current wheel speed, no torque is transmitted to driving elements of a hub (e.g., chainring_rpm<current_gear_ratio*current_wheel_speed+safety_margin). It is desirable to complete the shift as fast as possible. Accordingly, the chainring may be driven as fast as possible without applying torque to, for example, the rear wheel. The assist motor speed may therefore be set as a function of the current gear ratio and the current wheel speed. In an embodiment, the motor output torque is limited below a threshold during a motor aided shifting event. For example, the motor output torque may be limited to two ("2") newton-meters ("N m").

The assist motor may run for as little time as is needed to complete the commanded shift. Any time the chainring is turning the opportunity for a chainring derailment is increased (e.g., with the low pedaling loads of the motor assisted shift). The duration that the motor runs may be a function of the currently selected cog, as different cogs have different expected times to complete shift. In one embodiment the rear derailleur (e.g., the processor and/or one or more sensors of the rear derailleur) may determine when the shift has been completed (e.g., the chain has derailed to the target cog). In this case, the motor may run until the derailleur has detected the completion of the shift.

In one embodiment, the automatic shifting described above may operate with the motor drive function while not pedaling (e.g., overdriving the chainring while not pedaling) even if the bicycle is configured for zero rider assistance. In this configuration, the assist motor may only run when the derailleur is shifting and not pedaling to facilitate shifting. When the rider is pedaling, the non-assisting mode of the e-bike system is honored.

In one embodiment, when in full automatic mode, the rider may still command a shift from a control device (e.g., a shifter). When a rider commanded shift occurs, the automatic shifting functions described above are disabled for a configurable period of time to allow the rider to negotiate a section of riding that necessitated manual override. If the rider commands a shift while not pedaling, the assist motor (e.g., the assist motor 200) may activate to facilitate completion of the shift.

In one variant of the full automatic mode, an automatic only if coasting mode, may be initiated by the processor automatically or in response to user input. In the automatic only if coasting mode, the automatic shifting discussed above only runs if the rider is not pedaling. This may be desirable to a rider riding aggressively so that the rider does not experience shock through the pedals of the bicycle resulting from a shift under a high load. While coasting, the derailleur shifts through gears to match changing wheel speed so that when the rider resumes pedaling, the rider is in a desirable gear.

In another mode, the motoshift only mode, the derailleur is only shifting gears in response to user input (e.g., commands) at, for example, the control device. If the rider commands a shift while not pedaling, the assist motor may activate to facilitate completion of the shift.

In the embodiment, the full automatic mode, the automatic only if coasting mode, and the motoshift only mode work with a cable actuated derailleur that is controlled by a motorized cable pulling device when no shift signal or shift actuation is imitated by a user. Motor assisted shifting while not pedaling (and when the user has not requested for a shift to occur) may be triggered by a non-electronically actuated shifting system that is able to communicate the shifting event to the e-bike system.

There are a number of operational states of a bicycle in which it is undesirable for the bicycle to attempt automatic shifting. For example, it is undesirable for the bicycle to attempt automatic shifting when the bicycle is being serviced in a stand, when the bicycle is laying on a side, when a user is walking alongside the bicycle, and when the bicycle is at rest. Preconditions for shifting may thus be provided.

As discussed above, both wheels may include at least parts of wheel speed sensors (e.g., wheel speed sensors 406). If the wheel speed sensors do not report a same or similar speed (e.g., within 0.1 RPM), this is a strong indication that the bicycle is being pedaled in a stand and the method described above should not shift the derailleur or command the motor to overdrive. There may be exceptions to this if the method described above is being evaluated in a stand. To accommodate this, the control system (e.g., the control system 400) may be put into an override mode to allow cruise control to run, even if the control system believes the bicycle is in a work stand. This override mode may be enabled through the e-bike interface, a mode selecting unit of the drivetrain, a mobile device application, or a button interaction with the derailleur.

In one embodiment, a number of sensors may be used to positively determine if the bicycle is actively being ridden, is in work stand, or is being walked. The sensors may include: one or more pressure sensors in the saddle and configured to detect rider weight; strain gauges in one of the crank arms or a bottom bracket to detect torque from legs of the rider; and/or strain gauges in grips or the handlebar configured to detect engagement with the handlebar by the rider.

If the rider crashes or the bike is set on a side, and one or more of the wheels are still turning, the method described above may recognize this as valid input and attempt to shift or run the motor overdrive function. To prevent this, an accelerometer in the rear derailleur may be used to determine orientation of the bicycle. While the derailleur is awake, the derailleur may take accelerometer readings at intervals (e.g., frequent intervals such as every 100 ms). By averaging these readings over a finite history (e.g., as a low pass filter), the orientation of the bicycle may be determined. The accuracy and response time of the orientation sensing functions may be increased by also using a gyroscope to complement the accelerometer data. The orientation sensors and functions may also exist in the e-bike system, a shifter, an electronic seatpost, or a stand-alone device used for detecting orientation.

The combination of wheel speed, crank cadence, and rider torque may be used in combination to determine if the bicycle is being lightly pedaled in a work stand or is actively being ridden. If the wheel speed accelerates from zero to some significant value that would trigger an automatic shift, the amount of energy input by the rider to achieve this speed may be used to determine if the bicycle is actively being ridden by the integral $\Sigma_0^{t\_elapsed} \tau(t)*\omega(t)dt$. If the energy used to accelerate the rider and bicycle is below a predetermined threshold, it may be inferred that the bicycle is being pushed or pedaled in a stand. This assumption may not be valid if the bicycle starts moving down an incline. An accelerometer or other orientation-sensing device may be used to supplement this decision. The processor may calculate the amount of energy and compare the calculated energy to the predetermined threshold. The predetermined threshold may be set based on experimental data.

If the bicycle is being pedaled in a bicycle stand—the wheel acceleration would not correlate with acceleration observed by an inertial measurement (IMU) unit or accelerometer. If sufficient wheel speed acceleration to IMU acceleration correlation is not satisfied, the processor may disable the automatic shifting functions.

Modern cassettes provide an extremely wide gear ratio range so that the rider may easily pedal up steep hills as well as effectively pedal down hills or with a strong tailwind. When a rider begins pedaling from a standstill, it is desirable to be in a low gear but typically not the lowest gear, depending on the gears installed on bike. If the rider is in a very large cog as the bicycle accelerates from a stop on flat ground, the rider will quickly be at an uncomfortably high pedaling cadence. In one embodiment, the derailleur has a configurable minimum cog that the automatic shifting method may not shift beyond as the rider decelerates without pedaling (e.g., coasts) to a low speed or stop.

It is still necessary that the rider be able to access the largest cog(s) when needed (e.g., climbing a steep hill). If the rider is slowing down such that the automatic shifting would select a cog below the minimum configured cog and the user is still pedaling (e.g., not coasting), it may be assumed that there is a functional need for a lower gear and the derailleur may shift. The pedaling load (e.g., bottom bracket torque from rider) may provide an additional input to determine if the bicycle should shift to a lower gear than the configured minimum. The method may require that the rider be pedaling and be applying torque above a minimum threshold to shift to a lower gear than the configured minimum.

When the rider resumes pedaling from a stop (e.g., in a gear above the largest cog) the automatic shifting method attempts to shift down to achieve the target cadence, defeating the purpose of a minimum cog. To prevent this, the processor may calculate an acceleration of the bicycle from a derivative of the speed sensor data. If the bicycle is accelerating above a predetermined threshold, and the target gear is a lower gear than the current gear and within a threshold number of gears from the current gear, the processor may ignore the downshift. Alternatively or additionally, the automatic shifting method may not be reinitiated for a short time period after start of motion from stop (e.g., two seconds).

In one embodiment, the automatic shifting method is not able to shift to a lowest gear unless the bicycle is riding up an incline (e.g., unless the processor determines the bicycle is riding up the incline). For example, the bicycle may include an IMU or an accelerometer configured to identify when the bicycle is riding up an incline. The automatic shifting method may limit the lowest gear the automatic shifting method may select, and the processor may temporarily remove the limit when the IMU or the accelerometer identifies the incline. Thus, the automatic shifting method may time rear derailleur shift execution with crank position.

In an embodiment, gear changer, or derailleur, actions may be timed and/or otherwise correlated with angular position of the crank arm. For example, derailleur shift operations may be timed to act with particular angular positions of the crank arm.

When a rear shifting system executes a shift, the rider may experience a discontinuity in their pedaling stroke, such as a short but fast crank advancement which may be disturbing or cause an unpleasant feeling for the rider. Also, in some rear shifting systems it is desirable that the chain tension be low during shifting to prevent damage to a cassette, chain, or gearbox. Because the rider cannot anticipate when the automatic shifting algorithm will execute a shift and adjust their pedaling force accordingly during the shift, it is beneficial to both the rider and the shifting mechanism that the shifts occur when the rider's input torque is low. As a rider pedals there are typically regions of low torque input, such as when the cranks are in the vertical position. A crank cadence, angular position, or angular velocity sensor may be used to delay, and/or otherwise time, the start of the shifting motion in order to cause the shift to execute in a desirable crank arm location for appropriate rider input torque. Some sensors, such as a traditional cadence sensor, may reference a fixed location on the bicycle frame to time crank rotating speed. A signal may be sent from the cadence sensor as is passes the frame reference. When the rear derailleur chooses to execute a shift from the automatic shifting algorithm—it will wait until the cranks are in a position such that the shift will complete at a desirable location in the rider's pedaling motion. The derailleur uses the cadence sensor frame reference signal along with the crank cadence data to maintain an estimated position of the cranks at all times. In an embodiment, the frame mounted portion of a cadence sensor may be positioned relative to an appropriate shift zone for the crank arm position. For example, the frame mounted part of a cadence sensor may be mounted to a seat stay portion of the frame, and another portion of the cadence sensor may be mounted to a crank arm. As such, the shift zone may be initiated upon sensing of the crank arm portion of the sensor, as this orientation may provide indication that the crank arms have reached optimal shifting position when sensed.

Figure 6:
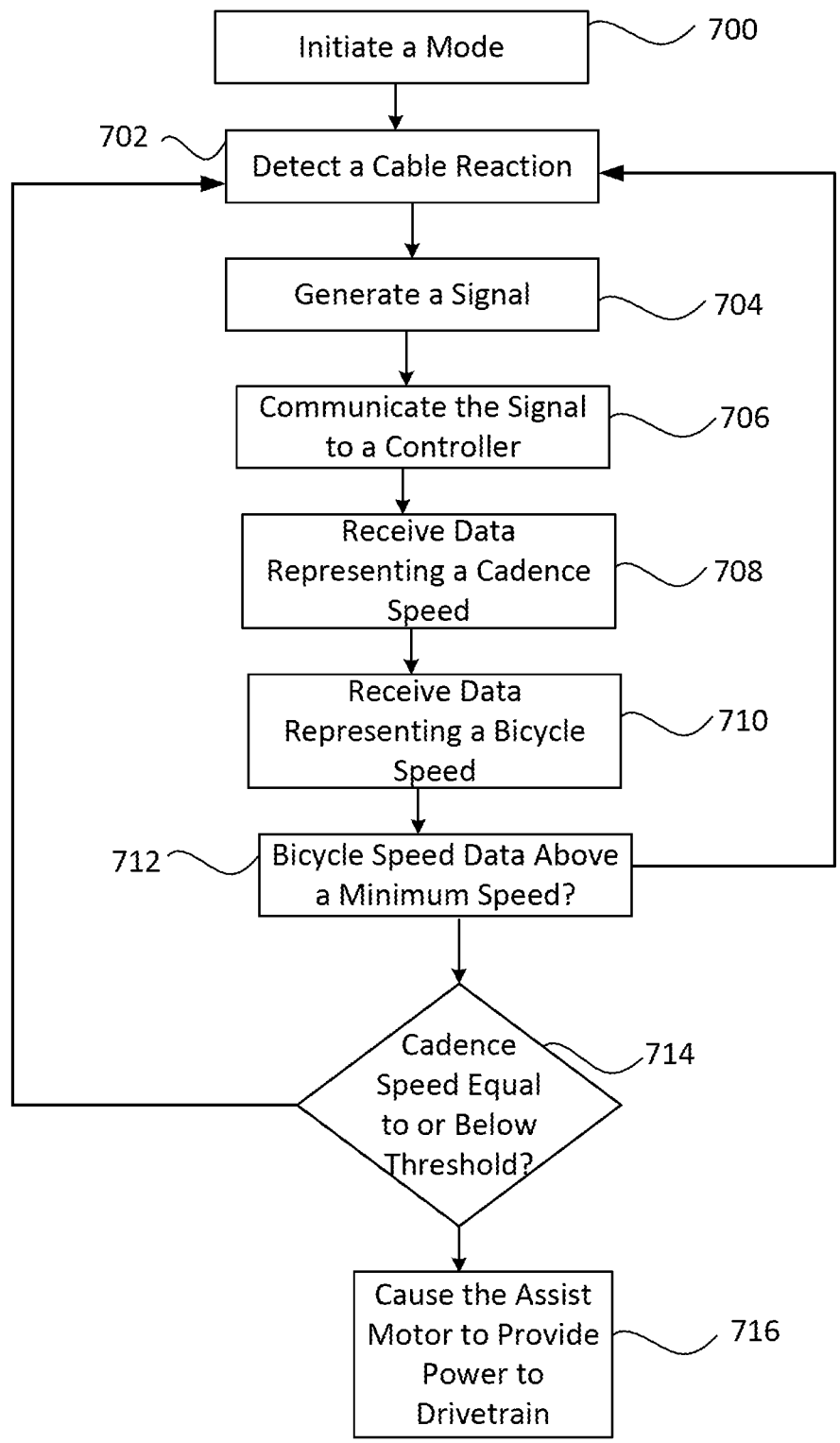
FIG. 6 is a flow chart of an embodiment of semi-automatic shifting.

FIG. 6 is a flow chart of an embodiment of a method for electromechanical control of components of the bicycle 100, for example. The flowchart also illustrates a method for semi-automatic shifting. In the case of semi-automatic shifting, the assist motor will not assist a rider unless the rider indicates a shift is desired (e.g., by operating a shifter). As presented in the following sections, the acts may be performed using any combination of the components indicated in previous figures. For example, the following acts may be performed by at least some components of the control system 400, as well as additional or other components. In an embodiment, the acts may be performed by, for example, the rear derailleur 36, the e-bike controller 402, the power assist device 200, the one or more sensors, or any combination thereof. Additional, different, or fewer acts may be provided. The acts are performed in the order shown or in other orders. The acts may be repeated. For example, in act 700, a processor initiates a mode (e.g., a semi-automatic mode) for a bicycle. The processor may initiate the semi-automatic mode based on user input or automatically based on sensed riding conditions. The processor may be a processor of the derailleur 36 or the bike controller 402. In an alternate embodiment, the processor is a processor of the derailleur and initiates the semi-automatic mode based on instructions from another processor that received the user input or identified the sensed riding conditions (e.g., the e-bike controller 402). Act 700 is optional and may not be performed in some embodiments.

In act 702, a detection device detects a cable reaction. The cable reaction may be indicative of a shift of the gear changer. For example, the detection device (e.g., detection device 212) may detect that a user may have operated the shifters 94 on the handlebars 22 of the bicycle 100 in order to shift the rear derailleur 36. This may be detected when the detection device 212 detects a movement or other reaction of the cable 210.

In act 704, a signal is generated. The signal is generated by the detection device. The signal is indicative of the cable reaction. For example, the detection device 212 generates a signal indicating a shift of the gear changer (e.g., rear derailleur 36).

In act 706, the signal is communicated. In an embodiment, the detection device communicates the signal to a processor or controller. For example, the detection device 212 communicates the signal indicating the shift of the rear derailleur 36 to a controller, such as a processor or controller in the rear derailleur 36 or bike controller 402.

In act 708, the processor or controller receives data representing a cadence, or pedaling rate, from a sensor. The sensor may be a cadence sensor and the data may be cadence data/current cadence speed (e.g., a pedaling speed sensor or crank cadence sensor; the pedal speed sensor 404). The cadence sensor measures crank arm rotation as a rotational rate of the crank arm to which a pedal of the bicycle is attached. The measure may be a continuous measurement or performed periodically at a predetermined interval. The data representing the crank arm rotation may indicate a rotational speed value (e.g., in revolutions per minute).

In act 710, the processor receives data representing a bicycle speed. The bicycle speed data may be provided by a speed sensor (e.g., a wheel speed sensor, such as the wheel speed sensor 406; air speed using a pitot tube, etc.). The speed sensor measures current bicycle speed. In the example, the wheel speed sensor 406 measures rotational speed of a wheel continuously or at a predetermined interval. The received data representing the wheel speed may be for a front wheel of the bicycle and/or a rear wheel of the bicycle. The data representing the wheel speed may be a rotational speed value (e.g., in revolutions per minute).

In act 712, the processor determines whether the current bicycle speed achieves a threshold. The threshold may be a minimum speed. The threshold is achieved when the current bicycle speed is greater than or above a predetermined minimum speed of the bicycle. The predetermined minimum speed represents, for example, a functional minimum rotational wheel speed. If the processor determines the current wheel speed is less than the predetermined minimum wheel speed, a shift is not initiated, and the method returns to act 702. If the processor determines the current wheel speed is greater than the predetermined minimum wheel speed, the method moves to act 714. This is to prevent overdriving the chainring, as noted above during the discussion of FIG. 5.

In act 714, the processor or controller determines whether the current cadence data received in act 708 achieves a threshold. The threshold may be a maximum cadence threshold. The threshold is achieved if the current cadence speed is equal to or below the threshold. If the threshold is achieved, the method moves to act 716. If the current cadence speed is above the threshold (e.g., 1 RPMs) the method returns to act 702 and no power will be provided from the assist motor (e.g., the assist motor 202) to the drivetrain (e.g., the drivetrain 70). Thus, power is provided to the drivetrain from the assist motor when the cadence speed data is equal to or below the threshold. The assist motor is prohibited from providing power to the drive train in response to the signal when the current cadence data is above the threshold.

In act 716, the processor or controller causes the assist motor to provide power to the drivetrain in response to the signal. For example, the processor or controller may instruct the assist motor, such as assist motor 202, to provide motive power to the drivetrain. To provide this motive power, the assist motor may be caused to activate or operate to generate power and provide the power to the drivetrain. Thus, the assist motor may provide power to the drivetrain. By applying power to the drivetrain, the assist motor drives the chainring slowly for a period of time. For example, the period may be two seconds. Each time a shift is detected, the assist motor is turned on if the rider is not pedaling the bicycle 100 and/or the bicycle 100 is traveling at a sufficient speed such that driving the chainring does not accelerate the bicycle. The processor determines the rider is not pedaling when the current cadence speed is at or below the maximum cadence threshold. The processor determines the bicycle is traveling at a sufficient speed by ensuring the bicycle speed is at or above the minimum speed threshold. This may be done in order to complete the shift requested by the user. For example, after a user requests a shift by pressing on shifters 94, the chain 72 is moved up or down onto a different cog of rear cassette 41 via a contraction or extension of cable 210 that runs from the shifters 94 to the rear derailleur 36. In an example, the electric power assist motor 202 is configured to provide power to the drivetrain 70, and a controller is configured to receive a signal from the detection device 212, the signal is generated in response to a cable reaction. The cable reaction indicates a shift of the gear changer. The assist motor 202 provides power to the drivetrain 70 in response to the signal.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A method of controlling a bicycle having a drivetrain, the drivetrain including a chainring, a gear changer and an electric power assist motor configured to provide power to the drivetrain, the method comprising:
   detecting, by a detection device, a cable reaction indicating a shift of the gear changer;
   generating, by the detection device, signal;
   communicating, by the detection device, the signal to a controller;
   after communicating the signal to the controller, receiving, from a cadence sensor, a current cadence speed;
   determining whether the current cadence speed is equal to or below a cadence threshold; and
   causing, by the controller in response to the signal, the electric power assist motor to provide power to rotate the chainring to perform the shift based on determining the current cadence speed is equal to or below the cadence threshold.

2. The method of claim 1, wherein the gear changer is a cable actuated rear derailleur.

3. The method of claim 1, further comprising:
   providing power to rotate the chainring of the drivetrain when the current cadence speed is equal to or below the threshold; and
   prohibiting the electric power assist motor from providing power in response to the signal when the current cadence speed is above the threshold.

4. The method of claim 1, further comprising:
   after communicating the signal to the controller, receiving, from a speed sensor, a current bicycle speed; and
   determining, by the controller, whether the current bicycle speed is above a minimum speed.

5. The method of claim 4, wherein the speed sensor is a wheel speed sensor.

6. The method of claim 1, wherein the cable reaction is caused by an actuation of a shifter.

7. The method of claim 6, wherein the cable reaction is a movement of a cable.

8. The method of claim 1, wherein the detection device is at least one of a switch, a potentiometer, and a sensor.

9. The method of claim 8, wherein the detection device is located on a cable connected to a shifter.

10. The method of claim 9, wherein the cable is a Bowden cable.

11. The method of claim 8, wherein the detection device is located in a shifter and momentarily actuated with each action of the shifter or the gear changer.

12. The method of claim 1, wherein the detection device is located in a rear derailleur.

13. The method of claim 8, wherein the detection device is a Hall effect sensor, and may monitor the movement of a magnet.

14. A control system for a bicycle, comprising:
   a drivetrain, the drivetrain including a gear changer and a chainring;
   a detection device, configured to be disposed on the bicycle;
   an electric power assist motor configured to provide power to the drivetrain; and
   a controller, the controller configured to:
   receive, from the detection device, a signal generated in response to a cable reaction, the cable reaction indicating a shift of the gear changer;
   after receiving the signal the controller, receive, from a cadence sensor, a current cadence speed;
   determine whether the current cadence speed is equal to or below a cadence threshold; and
   in response to the signal, cause the assist motor to provide power to rotate the chainring to perform the shift based on determining the current cadence speed is equal to or below the cadence threshold.

15. The control system of claim 14, wherein the detection device is at least one of a sensor, a switch, and a potentiometer.

16. The control system of claim 15, wherein the detection device is located in at least one of a shifter, the gear changer, and a cable connected to the shifter.

17. The control system of claim 16, wherein the gear changer is a rear derailleur.

18. The control system of claim 14, wherein after receiving the signal the controller is further configured to receive, from a speed sensor, a current bicycle speed; and determine whether the current bicycle speed is above a minimum speed.

\* \* \* \* \*